US012029240B2

(12) United States Patent
Risolia et al.

(10) Patent No.: US 12,029,240 B2
(45) **Date of Patent: *Jul. 9, 2024**

(54) TIP-LESS WATER PIPE

(71) Applicants: Joseph Robert Risolia, Miami, FL (US); Jacob Levy, Miami, FL (US)

(72) Inventors: Joseph Robert Risolia, Miami, FL (US); Jacob Levy, Miami, FL (US)

( * ) Notice: Subject to any disclaimer, the term of this patent is extended or adjusted under 35 U.S.C. 154(b) by 332 days.

This patent is subject to a terminal disclaimer.

(21) Appl. No.: 16/953,212

(22) Filed: Nov. 19, 2020

(65) Prior Publication Data

US 2021/0068451 A1 Mar. 11, 2021

Related U.S. Application Data

(63) Continuation of application No. 15/939,890, filed on Mar. 29, 2018, now Pat. No. 10,869,498, which is a continuation-in-part of application No. 15/870,251, filed on Jan. 12, 2018, now abandoned.

(60) Provisional application No. 62/498,955, filed on Jan. 12, 2017.

(51) Int. Cl.

| | |
|---|---|
| ***A24F 1/30*** | (2006.01) |
| ***A24F 1/02*** | (2006.01) |
| ***A24F 9/14*** | (2006.01) |
| *H04R 1/02* | (2006.01) |

(52) U.S. Cl.

CPC .................. *A24F 1/30* (2013.01); *A24F 1/02* (2013.01); *A24F 9/14* (2013.01); *H04R 1/028* (2013.01); *H04R 2420/07* (2013.01)

(58) Field of Classification Search

CPC ..................................... A24F 7/04; A24F 1/30

See application file for complete search history.

(56) References Cited

U.S. PATENT DOCUMENTS

| | | | | |
|---|---|---|---|---|
| 3,028,702 A | | 4/1962 | Cyr | |
| 4,029,109 A | | 6/1977 | Kahler | |
| 4,241,741 A | | 12/1980 | Cabados et al. | |
| 5,489,043 A | * | 2/1996 | Newman .................. | A24F 1/30 220/636 |
| 6,935,345 B2 | | 8/2005 | Carstens et al. | |
| 7,404,405 B1 | | 7/2008 | Mehio | |
| 7,905,491 B2 | | 3/2011 | Gray | |
| 8,387,624 B1 | | 3/2013 | Ducker et al. | |
| D741,029 S | | 10/2015 | Risso et al. | |

(Continued)

*Primary Examiner* — Christopher M Rodd
*Assistant Examiner* — Jennifer A Kessie
(74) *Attorney, Agent, or Firm* — Jason P. Webb; Pearson Butler

(57) ABSTRACT

A spill-resistant water pipe, water pipe base, and water pipe assembly for filtering smoldering herbal materials. There is a fluid vessel having a bottom surface, a smoking bowl coupled to the fluid vessel, a neck with a mouthpiece coupled to the fluid vessel, and a base removably coupled to the bottom of the fluid vessel. The base has a rounded/convex bottom with a weight greater than a combined weight of the fluid, the fluid vessel, the smoking bowl, and the neck. There is also an annular bumper member (disc) circumscribing the base and extending laterally outward therefrom, with an exterior wall extending upwardly from a lateral edge of the annular bumper member and a container disposed thereon. There is a power module that powers one or more of: speakers, wireless signal transponders, scent dispensers, clocks, light emitters, light sensors, and position sensors.

19 Claims, 6 Drawing Sheets

(56) References Cited

U.S. PATENT DOCUMENTS

| | | | | |
|---|---|---|---|---|
| 9,345,940 | B2 | 5/2016 | Chiu | |
| 2004/0163658 | A1 | 8/2004 | Mehio | |
| 2007/0079839 | A1* | 4/2007 | Russon | A24F 1/30 131/173 |
| 2009/0227176 | A1 | 9/2009 | Skourtis | |
| 2009/0288670 | A1* | 11/2009 | Lee | A23G 3/56 131/330 |
| 2015/0181931 | A1 | 7/2015 | Hoover et al. | |
| 2018/0110938 | A1* | 4/2018 | Trzecieski | A61L 9/00 |
| 2018/0199626 | A1* | 7/2018 | Cheng | A24F 1/32 |

* cited by examiner

TIP-LESS WATER PIPE

CROSS-REFERENCE TO RELATED APPLICATIONS

This invention claims priority as a continuation application, under 35 U.S.C. § 120 to the U.S. Non-provisional patent application Ser. No. 15/939,890 by Risolia et al., which is incorporated by reference herein in its entirety; and, thereby, this invention claims priority, under 35 U.S.C. § 120 to the U.S. Non-provisional patent application Ser. No. 15/870,251 by Risolia et al., which is incorporated by reference herein in its entirety; and, thereby, this invention claims priority, under 35 U.S.C. § 120, to the U.S. Provisional Patent Application No. 62/498,955 by Risolia filed on 12 Jan. 2017, which is incorporated by reference herein in its entirety

BACKGROUND OF THE INVENTION

Field of the Invention

The present invention relates to smoking accessories, specifically to water pipes.

Description of the Related Art

Water pipes (aka bong, hookah, billy, bing, or moof) are filtration devices generally used for smoking herbal substances like tobacco and cannabis. Such allow a user to draw smoke that passes through water and up a tube into the user's mouth and lungs. Water pipes are generally water-tight and air-tight vessels that include an inlet (bowl and stem), where the herbal material is smoked, that is coupled to a water container, with the stem extending below water level so that air bubbles upward through the water. There is a neck with a mouthpiece that is also coupled to the water vessel, through which the user draws the filtered smoke that has bubbled up through the water. The mechanics of the device are similar to a laboratory gas washing bottle. Some water pipes incorporate additional filtering structures and mechanisms. A hookah functions similar to a bong by filtering smoke from smoldering herbs by bubbling them up through water, but is generally either larger or more complicated, sometimes including wind guards, charcoal burner plates, valves and/or hoses, and the like.

Bubbling up through the water, the smoke is filtered of tar, ash, and other substances. Therefore, the resulting water becomes dirty and will often have a noxious odor, especially if released outside the water pipe or spilled. Sometimes people hit their bongs with their hands while reaching for something and knock them over, thus resulting in an unpleasant mess and foul odors.

Some improvements have been made in the field. Examples of references related to the present invention are described below in their own words, and the supporting teachings of each reference are incorporated by reference herein:

U.S. Pat. No. 8,387,624, issued to Ducker et al., discloses an apparatus includes a hookah having a bottom surface, hookah hose and a hookah bowl; a hookah suspension assembly for containing and suspending the hookah from an elevated structure; a hookah support structure on which a bottom surface of the hookah can rest; a number of flexible support members each engaging the support structure; a guide ring; the support members extending upwardly from the support structure to and engaging the guide ring preventing the guide ring from sliding down the support members below a predetermined point and forming a circumferential series of the support members, the support members extending further upwardly from the guide ring and converging above the guide ring for engaging a suspension member secured to an elevated structure; so that the hookah and the hookah suspension assembly is elevated and suspended and the hookah is accessible for use and so that the hookah bowl is accessible between the support lines.

U.S. Pat. No. 7,404,405, issued to Mehio, discloses a hookah containment device that allows a user to smoke a prepared hookah while engaging in foot traffic. A portable hookah system includes a hookah and the hookah containment device tailored to mate with the hookah in a fashion to vertically stabilize the hookah during turbulent locomotion. The hookah containment device includes a sidewall adapted to form an interference fit with a hookah base, or includes within a receiving chamber means for releasably attaching the hookah within the interior of the hookah containment device.

U.S. Pat. No. 6,935,345, issued to Carstens et al., discloses a small bubble generator in a water stage cleaning and cooling a smoke filled air stream. A demister is a second embodiment of the invention to remove entrained water droplets from a cleaned and cooled smoke filled air stream issuing from the water stage.

U.S. Pat. No. 4,241,741, issued to Cabados et al., discloses a traditional bong having an upright barrel divided by a partition into a lower, dry chamber into which the pipe stem enters, and an upper aqueous chamber which is made spill-proof by virtue of a stand pipe extending up from the lower chamber through the baffle, this stand pipe being covered by an elongated cap which bobbles up and down in the liquid-filled upper chamber as the device is used and seals against an opening and an overlying baffle when the bong is inverted to prevent spillage. An additional novel effect is produced by the bobbling of the diverter cap which covers the stand pipe, which tends to mix the inhaled smoke with the water as it bobbles.

U.S. Patent Application Publication No. 20150181931, by Hoover et al. discloses a stabilizer for water pipes used for smoking substances, comprising a wrap configured to hold in a portion of the water pipe and a support that is wider than the base floor of the water pipe. The stabilizer can provide a wider and more stable base for the water pipe that can counteract and/or prevent tipping of the water pipe, and/or can provide shock absorption properties to reduce the risk of a water pipe tipping over and breaking or spilling.

The inventions heretofore known suffer from a number of disadvantages which include failing to prevent water spilling from a water pipe, taking up too much space, being too expensive, being difficult to manufacture, being difficult to use, not being safe, being likely to tip and spill if dropped, being messy, being difficult to use, being difficult to properly hand to a friend without spilling, not being maneuverable, requiring extra space for accessory items, and failing to provide useful storage associated therewith.

What is needed is a water pipe that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available smoking accessories. Accordingly, the present invention has been developed to provide a tip-less water pipe and/or water pipe base.

There may be a spill-resistant water pipe for filtering smoldering herbal materials. Such may include one or more of a fluid vessel configured to contain a filtering fluid, the fluid vessel having a bottom surface; a smoking bowl coupled to the fluid vessel; a neck with a mouthpiece coupled to the fluid vessel; and/or a base coupled to the bottom of the fluid vessel, the base having a rounded bottom, and the base having a weight greater than a combined weight of the fluid vessel, the smoking bowl, and the neck.

It may be that the weight of the base is greater than a combined weight of a weight of an amount of water necessary to appropriately fill the fluid vessel, the fluid vessel, the smoking bowl, and the neck. It may be that the base is permanently affixed to the bottom of the fluid vessel. It may be that the base is removably coupled to the bottom of the fluid vessel. It may be that the base includes a coupling structure on a top surface thereof and the fluid vessel includes a mating coupling structure on a bottom surface thereof, the coupling structure and the mating coupling structure each shaped to selectably and removably mate together.

There may also be an annular bumper member circumscribing the base and extending laterally outward therefrom. It may be that the annular bumper member includes an exterior wall extending upwardly from a lateral edge of the annular bumper member, thereby forming a walled shelf formed by the exterior wall and a top surface of the annular bumper member. It may be that the annular bumper member further includes a storage container disposed on a top surface thereof.

There may also be a power module functionally coupled to a component module selected from the group of component modules consisting of: speakers, wireless signal transponders, scent dispensers, clocks, light emitters, light sensors, and position sensors.

In another non-limiting embodiment, there is a water pipe assembly that may include one or more of: a water pipe body with a bowl and neck, the water pipe body having water disposed therein; and/or a weighted rounded base functionally coupleable to a bottom of the water pipe body, wherein the weighted rounded base weighs more than the water pipe body and the water and the weighted rounded base is rounded about a bottom surface thereof.

It may be that the weighted rounded base further includes an annular bumper member circumscribing the weighted rounded base and extending laterally outward therefrom. It may be that the annular bumper member includes a cavity shaped to cradle materials therein. It may be that the weighted rounded base includes a power storage device functionally coupled to a speaker. It may be that the annular bumper member extends laterally further than any portion of the water pipe body.

In still yet another non-limiting embodiment, there is a water pipe base with a semi-spherical bottom surface, comprising a mating coupling structure selectably coupleable to a bottom of a water pipe, and an annular bumper circumscribing the coupling structure.

There may also be a component module selected from the group of component modules consisting of: speakers, wireless signal transponders, scent dispensers, clocks, light emitters, light sensors, and position sensors. There may also be a power module functionally coupled to a wireless transponder and an audio module that plays audio over a speaker disposed within the water pipe base.

It may be that the annular bumper member is shaped to form a cavity into which items may be disposed. It may be that the cavity is formed by a wall disposed about and extending upwardly from a lateral end of the annular bumper member.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
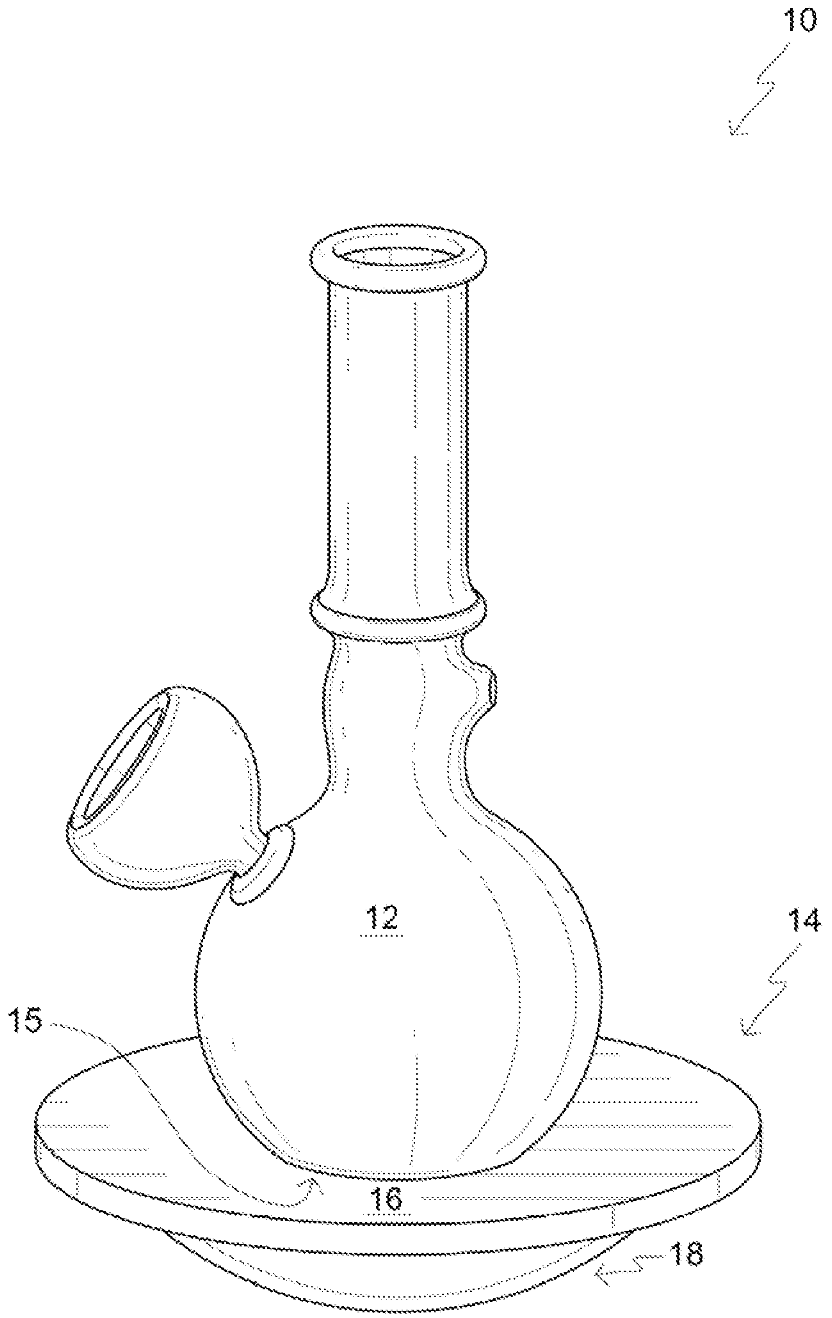
FIG. 1 illustrates a side perspective view of a water pipe, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a side perspective view of a water pipe, according to one embodiment of the invention. The water pipe is spill resistant and is used to filter smoldering herbal material for smoking consumption purposes. There is a water pipe body 10 having a fluid vessel 12 and a smoking bowl extending upwards and to the left of the fluid vessel and a neck with a mouthpiece coupled thereto and extending upwardly from the fluid vessel. The fluid vessel 12 contains a filtering fluid (generally water) inside.

There is shown a water pipe vessel 12 secured to a base 14 at a bottom 15 of the water pipe vessel 12. The base has an annular bumper member 16 and a weighted rounded bottom 18. The illustrated weighted rounded bottom weighs more than the water pipe body and also weighs more than the water pipe body plus the weight of water contained therein during normal use. The weight of the water may be calculated by multiplying the density of water times the volume of water used during normal use. It may also be measured by filling the vessel appropriately and then pouring that same water into a container to then be weighed. One may make this calculation according to the maximum amount of water that the vessel may contain in order to make sure that the device remains stable even if more than the usual amount of water is placed inside the vessel. Wherein the water vessel is generally spherical, as illustrated, the estimated water capacity may be determined by using the equation for the volume of a sphere, which is 4/3*Pi* (the radius cubed).

Accordingly, when the water pipe assembly is tipped, bumped or otherwise moved from an upright position, the rounded bottom combined with the relatively heavy weight in the base thereof causes the water pipe to return to an upright position on its own because that position is the most stable position. This effect is similar to how egg-shaped toys sold under the brand Weebles by Hasbro Playskool (1971) have a stable upright position, spawning the catch phrase "Weebles wobble, but they don't fall down."

The illustrated disc-shaped bumper 16 extends laterally beyond the lateral extension of any other portion of the water pipe assembly. The term "laterally" as used herein means normal to the up-down ray defined by the orientation of the device as used in a gravitational field, such that the fluid stays in the fluid vessel and the device may be operated normally. In such an orientation, the base is at the bottom (down) and the parts opposite the bottom of the base are at the top (up) and the ray defined between those two points is the up-down ray, to which "lateral" is the set of planes normal thereto and extending outward therefrom, so that to extend laterally is to extend within a set of such planes away from the up-down ray. The bumper 16 restricts the range of tipping that the unit can experience, thereby limiting the range of the "wobble" and also provides a surface on which other accessories may be disposed. The radius of the disc and the height of the rounded bottom may be selected so as to restrict the angular displacement (i.e. the amount that the assembly can wobble) of the assembly according to the following formula: the calculated selected maximum displacement angle is equal the arctangent of the (height of the base divided by the radius of the disc). Accordingly, the disc and base size may be selected to stop the tipping at a particular displacement angle, thereby limiting the wobble to angles within that range.

In the illustrated water pipe assembly, the bottom of the water vessel is coupled to the base. Such a coupling may be fixed and/or permanent, in that it is not readily decouplable without destroying the coupling structure. As a non-limiting example, the vessel and base may be coupled by adhesives, epoxy, rivets, welding, or the like and combinations thereof, or may even be a single molded piece. Such coupling is deemed "permanent" in the art of manufacturing despite the possibility that destructive force may be used to decouple the structures. Alternatively, the coupling may be removable, which means that it may be decoupled without destroying the coupling structure. This term "removable," as used herein, does not include coupling structures that are, in the broadest sense, removable by destruction, but includes those structure that are removable without destruction of the coupling structure, such as but not limited to: snaps, friction fitting, clips, locking toggles, threaded couplings (male and female), tacky adhesives that are reusable, suction cups, setae (e.g. the hair-like structures on gecko feet), and the like and combinations thereof.

Advantageously, one may also store objects on the illustrated disc, such as but not limited to lighters, matches, herb quantities, portable electronic devices, and the like and combinations thereof.

In one non-limiting embodiment, there is a water pipe (e.g. bong, hookah) that is resistant to being tipped over due to the structure of its base. There may be a weighted round bottom to the bottom of the water pipe to prevent it from falling over when bumped. There may be storage bins/shelves/compartments within the base that allows for storage of materials. Such a shelf may circumscribe the base and may act as a bumper that prevents the water pipe from tipping all the way over. The base may be integral to a water pipe or may be attachable to existing water pipes. There may be a wireless speaker in the base.

Figure 2:
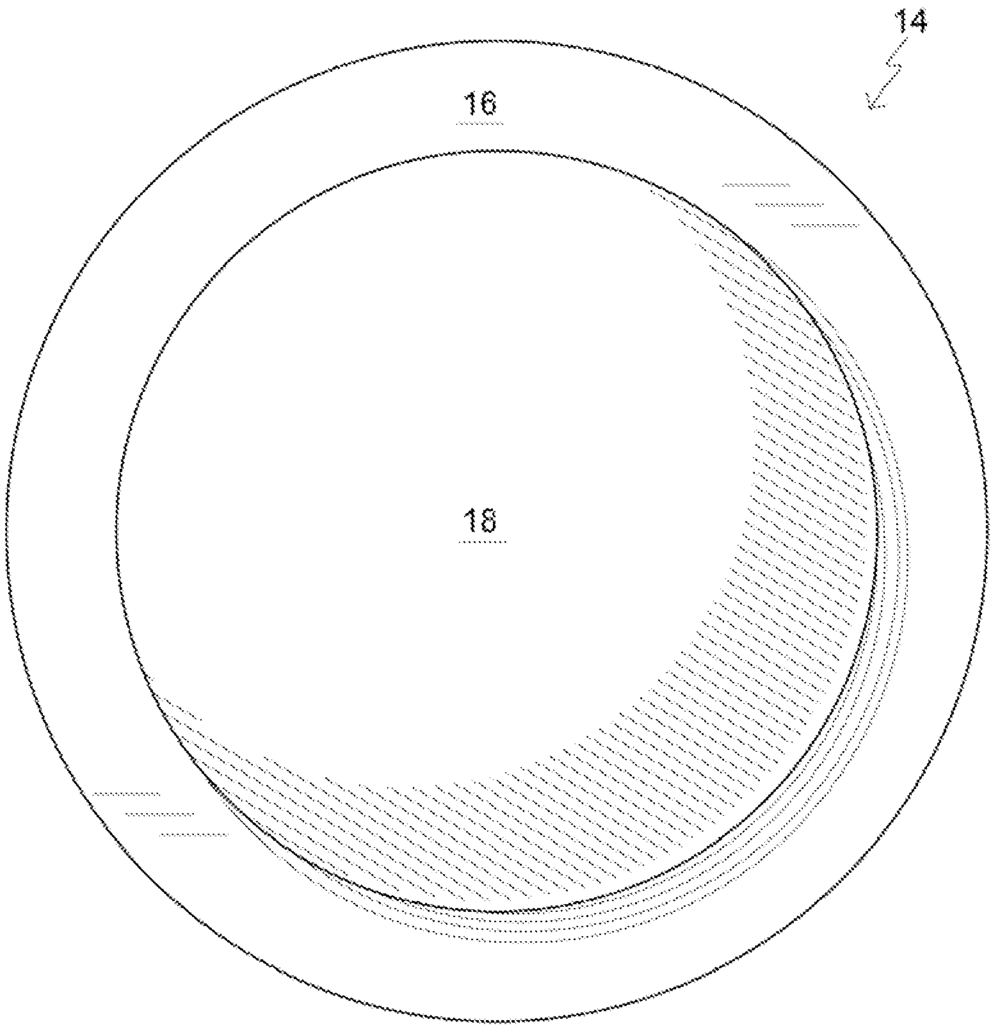
FIG. 2 illustrates a bottom plan view of a water pipe base, according to one embodiment of the invention.

FIG. 2 illustrates a bottom plan view of a water pipe base, according to one embodiment of the invention. There is shown a base 14 having an annular bumper member 16, the annular shape (i.e. ring-shape) is best illustrated from this view, and a weighted rounded bottom 18 that is semi-spherical. Semi-spherical, as used herein, is not limited to having a shape that is exactly a section of a sphere, but instead is a convex shape that is a portion of a shape that is similar to a sphere, such as but not limited to a section of an elippsoid or egg-shape, and the like and combinations thereof. The semi-spherical shaped bottom (i.e. rounded bottom) provides a curved surface on which the water pipe may wobble about a stable upright position. The annular bumper member 16 extends laterally beyond the range of the rounded (convex section) bottom 18.

Figure 3:
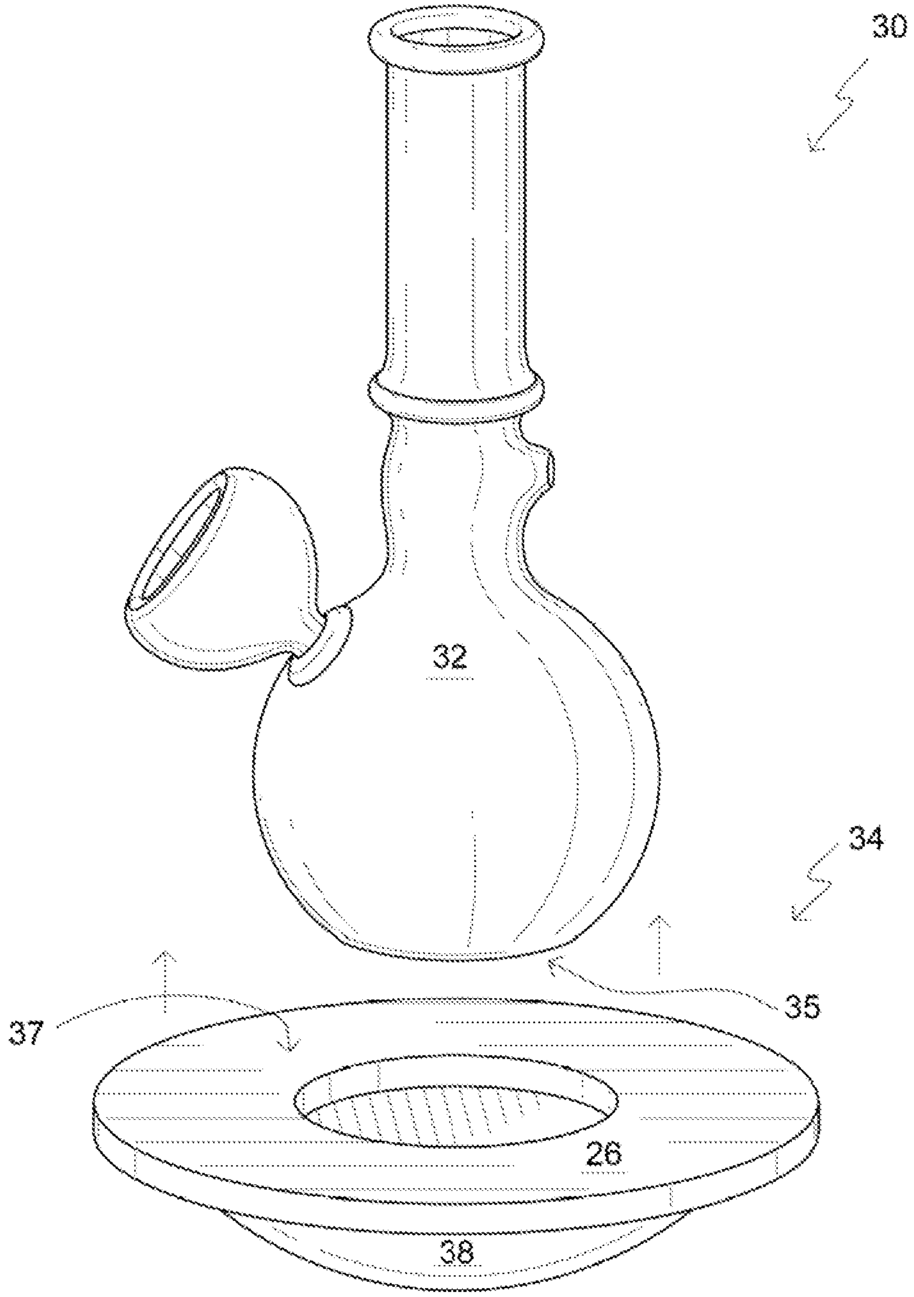
FIG. 3 illustrates a side perspective exploded view of a water pipe assembly, according to one embodiment of the invention.

FIG. 3 illustrates a side perspective exploded view of a water pipe assembly, according to one embodiment of the invention. There is shown a water pipe body 30 having a fluid vessel (water pipe vessel) 32 that may be secured to a base 34 at a bottom 35 of the water pipe vessel 32 by insertion of the water pipe body bottom 35 into a securing receptacle 37 in a top surface of the base 34. The base 34 has an annular bumper member (bumper disc) 26 and a weighted rounded bottom 38. The weighted rounded bottom weighs more than the water pipe body plus the weight of water contained therein during normal use and such weight may be concentrated at a bottom of the weighted rounded bottom. The bumper disc 26 restricts the range of tipping that the unit can experience and also provides a surface on which other accessories may be disposed. The base may be selectably attachable/detachable from the water pipe body or may be fixedly coupled thereto, such as by a layer of adhesive coupled to the bottom 35 of the vessel 32.

It may be that the water pipe assembly is provided separately, and a user may combine the water pipe body to the base. Such may be accomplished by gluing, screwing, bolting, riveting, clipping, snapping, friction fitting, or the like and/or combinations thereof. Such may be removable, so that a user may couple the same base to various water pipes. The coupling structure may be suitable for water pipes of various sizes, such as but not limited to using reusable tack between the base and the water pipe bodies.

Figure 4:
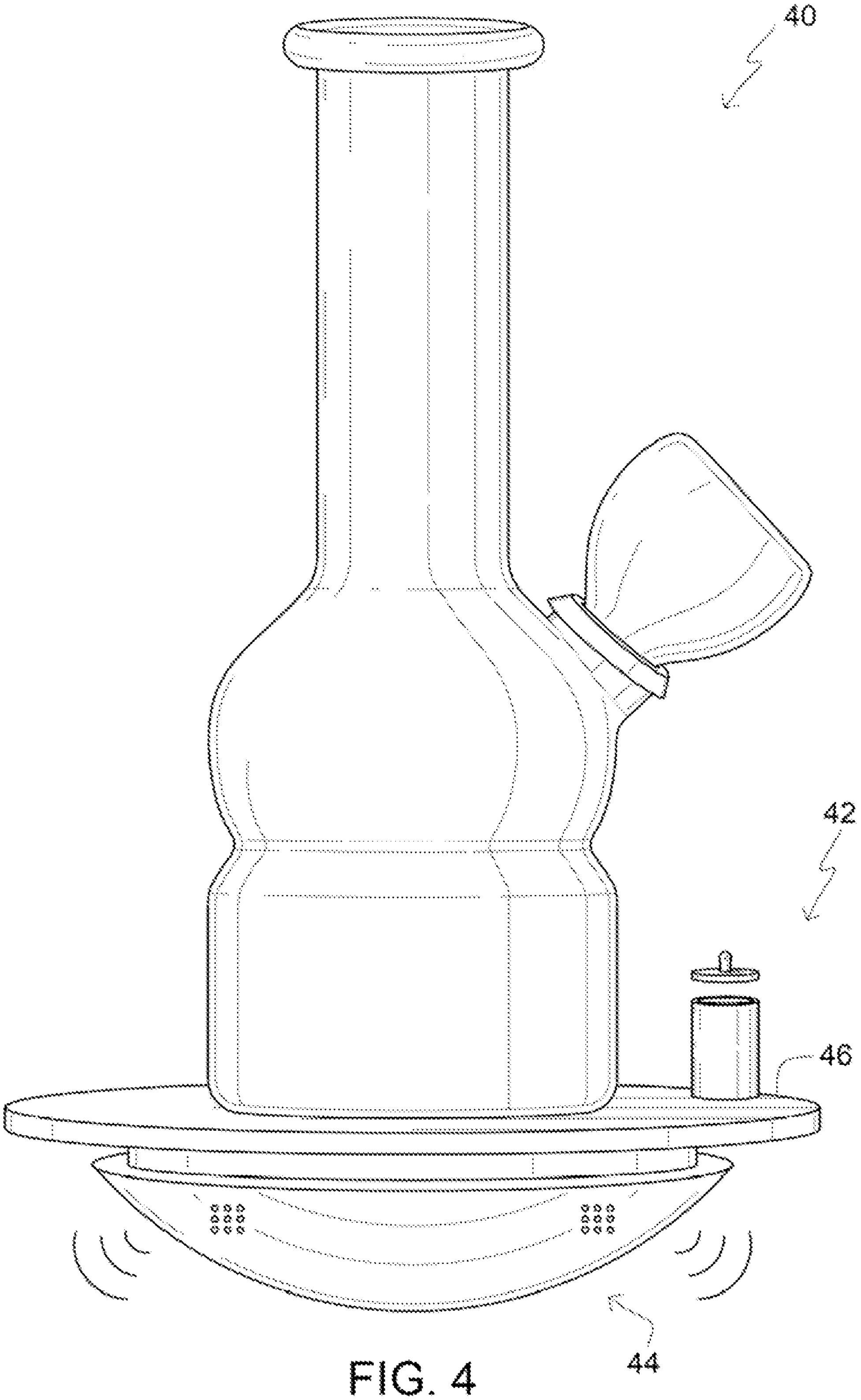
FIG. 4 illustrates a side perspective view of a water pipe, according to one embodiment of the invention.

FIG. 4 illustrates a side perspective view of a water pipe, according to one embodiment of the invention. There is shown a water pipe body 40 coupled to a base 44. The illustrated base 44 includes speakers and/or lights through which sound and/or light emanates. The illustrated base also includes a disc 46 on which a container 42 having a lid is coupled. The container 42 may be used to container desired items, such as but not limited to herbal quantities, tokens, lighters, matches, smoking paraphernalia, personal items (e.g. rings, watches) and the like. While the illustrated container is of a particular size and shape, it is understood that the sizes and shapes of containers that could be coupled to a top surface of the disc are plethoric.

Figure 5:
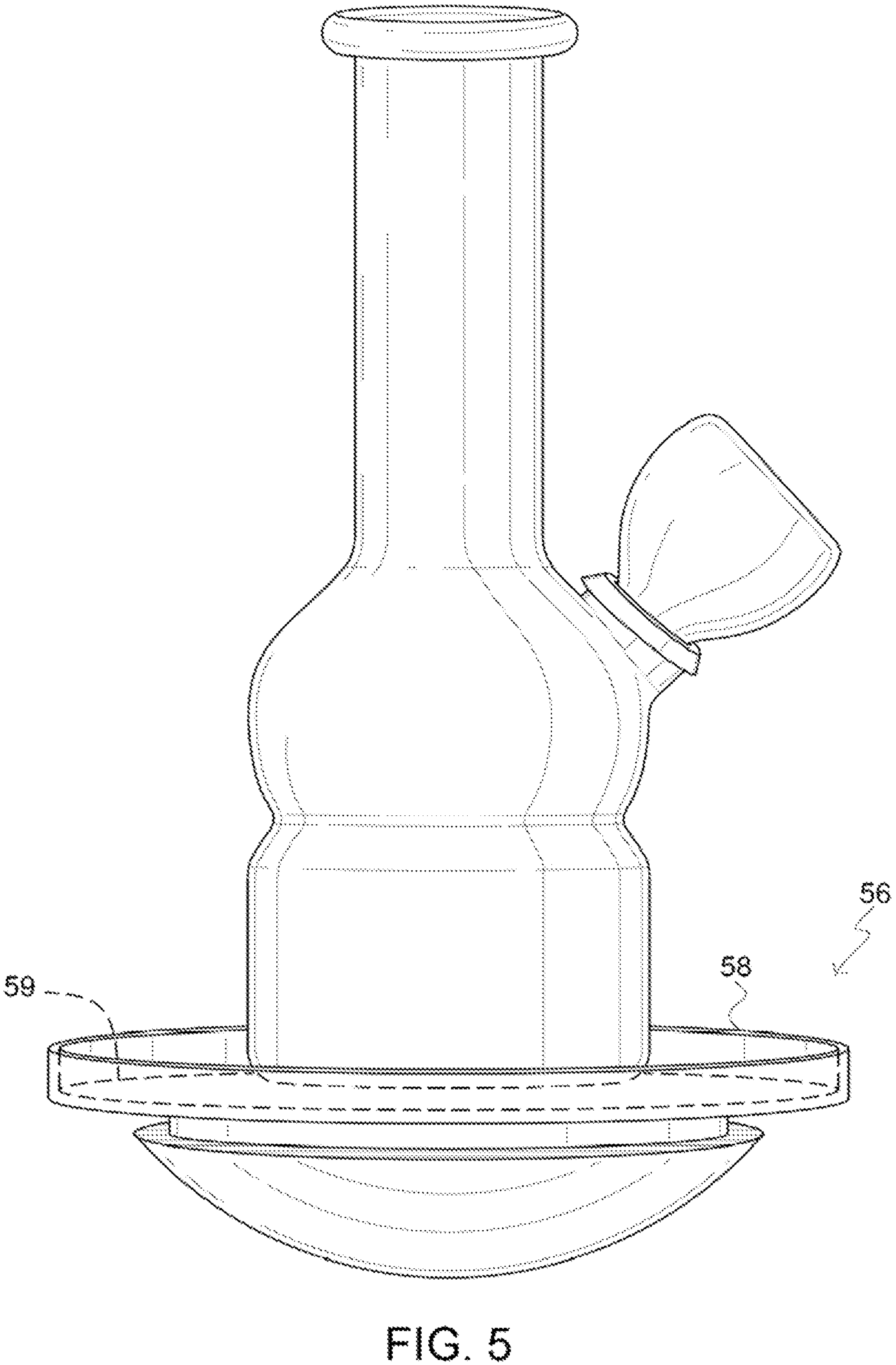
FIG. 5 illustrates a side perspective view of a water pipe, according to one embodiment of the invention.

FIG. 5 illustrates a side perspective view of a water pipe, according to one embodiment of the invention. There is shown a water pips assembly with an annular bumper member 56 circumscribing the base and extending laterally outward therefrom and having a top surface 59 about which an exterior wall 58 is disposed that extends upwardly from a lateral edge of the annular bumper member about a perimeter of the annular bumper member, thereby forming a walled shelf formed by the exterior wall in concert with the top surface of the annular bumper member.

Advantageously, the entire disc may function as a storage structure, the top surface and wall forming a concave structure facing upwards into which items may be stowed, which cavity shaped structure cradles materials stored therein. While the illustrated wall is orthogonal to the top surface of the disc, other concave cavity shapes are considered herein. As a non-limiting example, the top surface of the disc may be concave and form an annular bowl, wherein the top surface transitions smoothly to an exterior wall.

Figure 6:
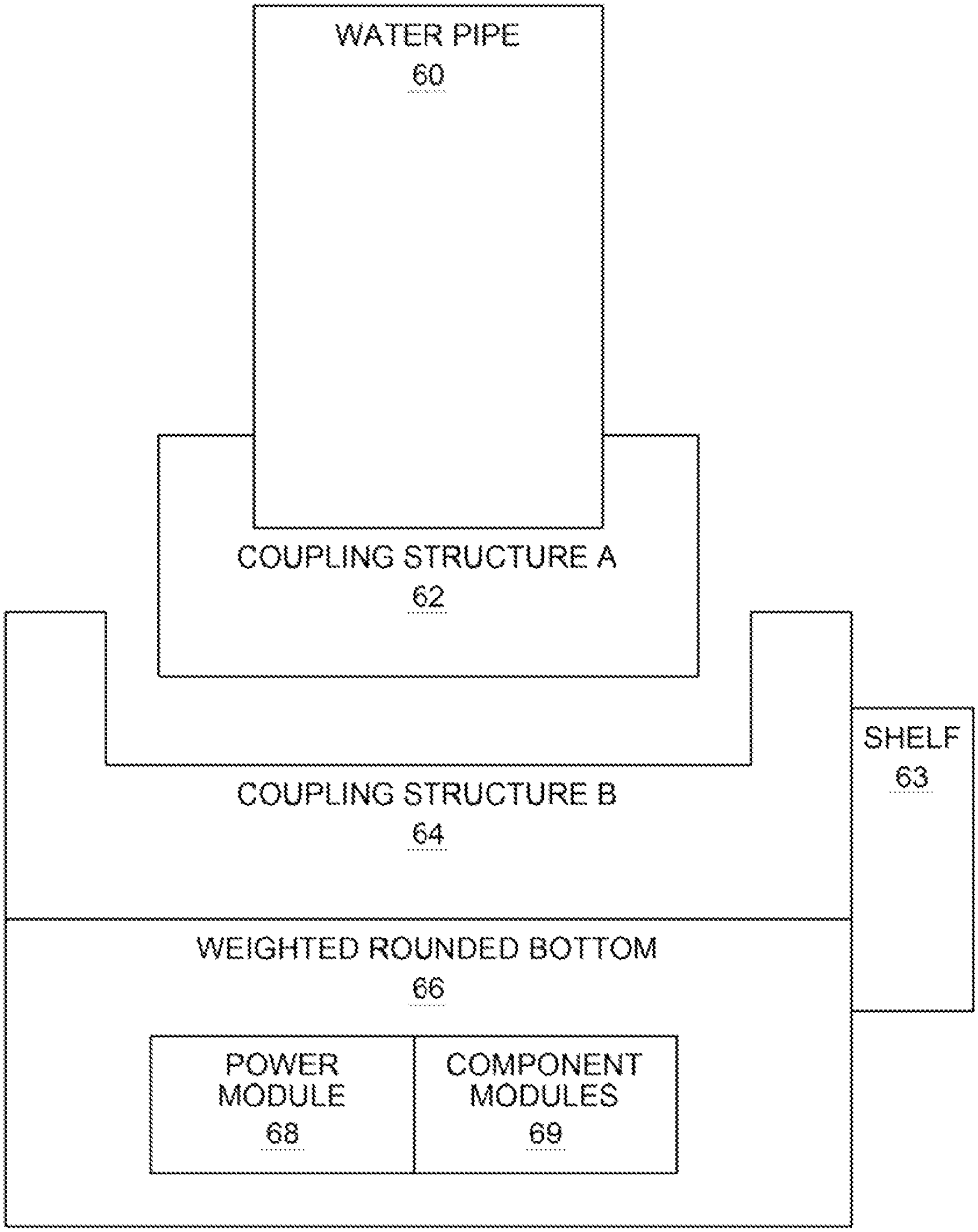
FIG. 6 is a modular view of a water pipe assembly having a water pipe base, according to one embodiment of the invention.

FIG. 6 is a modular view of a water pipe assembly having a water pipe base, according to one embodiment of the invention. There is shown a water pipe body 60 having a coupling structure A 62 that is couplable to the illustrated coupling structure B 64 of the base. The base includes the coupling structure B 64 coupled to each of a shelf (disc, annular bumper member) 63 and a weighted rounded bottom 66 which includes a power module 68 and associated component modules 69.

The illustrated water pipe 60 may include a fluid vessel configured to contain a filtering fluid, the fluid vessel having a bottom surface. It may also include a smoking bowl coupled to the fluid vessel. The smoking bowl may be in fluid communication with a stem that extends into the fluid vessel and terminates at a point within the fluid vessel below fluid level when fluid is disposed therein, such that air from the bowl bubbles up through the fluid from the terminating end of the stem during operation. It may also include a neck with a mouthpiece coupled to the fluid vessel, such that a user may draw air from the neck into their mouth and lungs. The neck may include a valve (often simply a hole in the side that is valved by the user's thumb, but may include actual valve structure) that allows for the user to draw air from the neck without causing air to bubble up from the stem. This allows a user to withdraw smoke from the neck without pulling more smoke into the neck, thereby preventing the waste of smoke when taking ones mouth from the neck.

The illustrated coupling structures A and B, 62 and 64, respectively, are mating coupling structures (one may be called a coupling structure while the other, which mates thereto may be called the mating coupling structure), in that they mate to each other. They may selectably and/or removably mate to each other and are generally disposed on the bottom the vessel and the top surface of the base. Such a structure may be removable or permanent. Non-limiting examples of such structures include snaps, clips, adhesives, ties, rivets, screws, bolts, clamps, friction fittings, threaded coupling members (male and female), locking toggles, layers of tacky material, and the like and combinations thereof. In some embodiments, one coupling structure is merely a surface that may receive the other coupling structure, as in the example of a layer of tacky material (e.g. gum) on a top surface of the base to which the bottom of the vessel may stick with applied thereto with some force.

The illustrated shelf 63 provides a surface on which to place items and conveniently stores the same while the device is in use and/or between uses. The surface may be concave or otherwise include a cavity or other storage structure/container. The shelf may be a disc or bumper structure, which may be an annular bumper member as described herein.

The illustrated weighted rounded bottom 66 includes sufficient weight to promote a stable upright position for the water pipe when coupled thereto. Generally, this means that the weighted rounded bottom weights more than the water pipe and generally also more than the water pipe plus an effective amount of water thereinside during use. The weight may also be distributed unevenly within the weighted rounded bottom so that it is primarily within a bottom region thereof, thus enhancing the stability thereof. The weight may be of any suitable material that provides an enhanced weight, including but not limited to minerals, ceramics, metals, plastics, wood, and the like and combinations thereof. The form of the material may be a solid insert, beads, nodules, sand-like material, fluid, and the like and combinations thereof.

The illustrated power module 68 provides power to the component modules and may include one or more batteries, solar power generators, mechanical generators, power transducers, and the like and combinations thereof. There may be a power cords that plugs into an outlet and one or more transformers or other circuits for changing power characteristics or otherwise changing/cleaning the power from the outlet, thus providing power thereto. The power module is in functional communication with the component modules as needed to permit them to carry out their functions.

The illustrated component modules 69 provide powered functionality to the base. Such may include lights (flashing, strobing, lasers, etc.), sound (music, tones, signals, etc.), interactivity (Bluetooth coupling to portable computing devices such as but not limited to smart phones, and the like and combinations thereof. There may be one or more component modules, such as but not limited to speakers (passive speakers, powered speakers, electrodynamic, flat panel, plasma arc, piezoelectric, etc.), audio modules (radios, media players, alarms, buzzers, wireless speakers like the Minijambox by Jawbone of 99 Rhode Island Street, 3$^{rd}$ Floor, San Francisco Calif. 94103), light emission modules/ light emitters (LED lights and light arrays, incandescent lights, laser emitters, etc.), wireless signal transponders (BlueTooth brand wireless communication protocols and devices, Wifi, infrared, microwave, mobile communications i.e. cellphone networks, etc.), scent dispensers (electronic cigarettes, metered/powered air fresheners and/or diffusers, etc.), clocks/timers, light sensors, and position sensors. Such devices may be coupled to each other. As a non-limiting example, position sensors may triggers activation of one or more of light, sound, or scent emitters if/when the water pipe changes position and/or orientation based on a predetermined script (e.g. if the water pipe tips more than a certain predefined angle, then the base lights up, makes a sound, and/or puffs out a scent).

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A spill-resistant vessel, comprising:

a. a fluid vessel, the fluid vessel having a bottom surface;

b.;

c. a neck with a mouthpiece coupled to the fluid vessel the neck having a smaller diameter than the fluid vessel, being taller than the fluid vessel, and extending upwardly therefrom; and d. a base coupled to the bottom of the fluid vessel, the base having a rounded bottom, and the base having a weight greater than a combined weight of the fluid vessel, and the neck, such that when the neck is tipped away from vertical, the rounded bottom in cooperation with the base that is weighed cooperates to bias the neck to rotate back to vertical orientation.

2. The vessel of claim 1, wherein the weight of the base is greater than a combined weight of a weight of an amount of water necessary to appropriately fill the fluid vessel, and the neck.

3. The vessel of claim 1, wherein the base is permanently affixed to the bottom of the fluid vessel.

4. The vessel of claim 1, wherein the base is removably coupled to the bottom of the fluid vessel.

5. The vessel of claim 1, wherein the base includes a coupling structure on a top surface thereof and the fluid vessel includes a mating coupling structure on a both m surface thereof, the coupling structure and the mating coupling structure each shaped to selectably and removably mate together.

6. The vessel of claim 1, further comprising an annular bumper member circumscribing the base and extending laterally outward therefrom.

7. The vessel of claim 6, wherein the annular bumper member includes an exterior wall extending upwardly from a lateral edge of the annular bumper member, thereby forming a walled shelf formed by the exterior wall and a top surface of the annular bumper member.

8. The vessel of claim 7, wherein the annular bumper member further includes a storage container disposed on a top surface thereof.

9. The vessel of claim 1, wherein the base further includes a power module functionally coupled to a component module selected from the group of component modules consisting of speakers, wireless signal transponders, scent dispensers, clocks, light emitters, light sensors, and position sensors.

10. A stabilized fluid container, comprising:

a. a fluid vessel, the fluid vessel having a. bottom surface;

b. a neck, coupled to the fluid vessel, the neck having a smaller diameter than the fluid vessel, being taller than the fluid vessel, and extending upwardly therefrom; and c. a base coupled to the bottom of the fluid vessel, the base having a rounded bottom, and the base having a weight greater than a combined weight of the fluid vessel, and the neck, such that when the neck is tipped away from vertical, the rounded bottom in cooperation with the base that is weighted cooperates to bias the neck to rotate back to vertical orientation.

11. The stabilized fluid container of claim 10, wherein the weight of the base is greater than a combined weight of a weight of an amount of water necessary to appropriately fill the fluid vessel and the neck.

12. The stabilized fluid container of claim 10, wherein the base is permanently affixed to the bottom of the fluid vessel.

13. The stabilized fluid container of claim 10, wherein the base is removably coupled to the bottom of the fluid vessel.

14. The stabilized fluid container of claim 10, wherein the base includes a coupling structure on a top surface thereof and the fluid vessel includes a mating coupling structure on a bottom surface thereof, the coupling, structure and the mating coupling structure each shaped to selectably and removably mate together.

15. The stabilized fluid container claim 10, further comprising a disc-shaped bumper member circumscribing the base and extending laterally outward therefron , wherein the bumper member extends laterally beyond the lateral extension of any other portion of the stabilized fluid container.

16. The stabilized fluid container of claim 15, wherein the bumper member includes an exterior wall extending upwardly from a lateral edge of the bumper member, thereby forming a walled shelf formed by the exterior wall and a top surface of the bumper member.

17. The stabilized fluid container of claim 16, wherein the bumper member further includes a storage container disposed on a top surface thereof.

18. The stabilized fluid container of claim 10, wherein the base further includes a power module ftinctionally coupled to a component module selected from the group of component modules consisting of speakers, wireless signal transponders, scent dispensers, clocks, light emitters, light sensors, and position sensors.

19. the stabilized fluid container of claim 10, wherein the base is dome-shaped such that the stabilized fluid container may wobble back and forth.

* * * * *